(12) United States Patent
Kim

(10) Patent No.: US 6,212,264 B1
(45) Date of Patent: Apr. 3, 2001

(54) CALL CHARGE TRANSFERRING METHOD IN PBX SYSTEM

(75) Inventor: Seong-Han Kim, Kumi (KR)

(73) Assignee: Samsung Electronic Co., Ltd., Suwon (KR)

(*) Notice: Subject to any disclaimer, the term of this patent is extended or adjusted under 35 U.S.C. 154(b) by 0 days.

(21) Appl. No.: 09/468,364

(22) Filed: Dec. 21, 1999

(30) Foreign Application Priority Data

Dec. 23, 1998 (KR) .................................................. 98-57862

(51) Int. Cl.$^7$ .................................................. H04M 15/00
(52) U.S. Cl. .................. 379/114; 379/157; 379/119; 379/212
(58) Field of Search ..................... 379/144, 114, 379/116, 117, 118, 119, 124, 126, 130, 136, 139, 140, 157, 164, 198, 199, 211, 212

(56) References Cited

U.S. PATENT DOCUMENTS

| | | | |
|---|---|---|---|
| 4,072,827 | 2/1978 | Oman | 379/122 |
| 4,788,719 | 11/1988 | Gupta | 379/114 |
| 5,402,472 | 3/1995 | MeLampy et al. | 379/67.1 |
| 5,432,845 | 7/1995 | Burd et al. | 379/210 |
| 5,436,961 * | 7/1995 | Kobayashi | 379/67.1 |
| 5,517,560 | 5/1996 | Greenspan | 379/114 |
| 5,590,187 * | 12/1996 | Greenspan | 379/212 |
| 5,638,432 * | 6/1997 | Wille et al. | 379/121 |
| 5,715,304 * | 2/1998 | Nishida et al. | 379/114 |
| 5,748,723 * | 5/1998 | Hanai et al. | 379/198 |
| 5,933,480 * | 8/1999 | Felger | 379/112 |
| 5,937,051 * | 8/1999 | Hurd et al. | 379/212 |

* cited by examiner

Primary Examiner—Stella Woo
Assistant Examiner—Binh K. Tieu
(74) Attorney, Agent, or Firm—Robert E. Bushnell, Esq.

(57) ABSTRACT

Disclosed is an apparatus and process for transferring a call charge during call forwarding in a private branch exchange (PBX) system. A call connected to a first extension terminal is forwarded to a second extension terminal upon request for call forwarding from the first extension terminal. It is determined whether the first extension terminal requests for call charge transfer. Information about the call charge of the first extension terminal for the call during the time period from a call set-up to the call forwarding is shifted to a call charge buffer of the second extension terminal. Upon the call charge transferring request, it is determined whether the forwarded call is completed, and the call charge of the second extension terminal is outputted upon completion of the forwarded call.

19 Claims, 3 Drawing Sheets

| EXTENSION NUMBER | CALLED NUMBER | CALL START TIME | CALL DURATION | CALL CHARGE |
|---|---|---|---|---|
| 131 | 123-4567 | 10:05:00 | 00:01:00 | 0 |
| 132 | 123-4567 | 10:06:00 | 00:05:00 | 200 |

FIG. 3

CALL CHARGE TRANSFERRING METHOD IN PBX SYSTEM

CLAIM OF PRIORITY

This application makes reference to, incorporates the same herein, and claims all benefits accruing under 35 U.S.C. §119 from an application entitled Call Charge Transfering Method in PBX System earlier filed in the Korean Industrial Property Office on Dec. 23, 1998, and there duly assigned Ser. No. 98-57862 by that Office.

BACKGROUND OF THE INVENTION

1. Field of the Invention

The present invention relates to a private branch exchange (PBX) system, and more particularly, to an apparatus and process of transferring call charges during call forwarding.

2. Description of the Related Art

A PBX system generally provides telephone usage information such as call start time, call duration, and call charge when an extension subscriber communicates with an external subscriber through an office line. In this PBX system, when a speech path is formed between a first extension subscriber and an external subscriber through the office line and then a call is forwarded to a second extension subscriber, the first extension subscriber is charged a call charge prior to the call forwarding, and the second extension subscriber is charged a call charge subsequent to call forwarding.

In the conventional PBX system, though the first subscriber originates a call to an external subscriber through an office line and forwards the call to the second extension subscriber, and the second subscriber occupies a substantial part of the call, the first and second extension subscribers are separately charged the call charges according to their call durations. Therefore, to generate billing for the second extension subscriber, the separate charges should inconveniently be added.

An exemplar of the contemporary art, Oman (U.S. Pat. No. 4,072,827, Telephone Patching Apparatus, Feb. 7, 1978) discloses an apparatus for bridging external calls such as an incoming call to a dialed out call in a private branch exchange system. Melampy et al. (U.S. Pat. No. 5,402,472, Automated Attendant for any Combination of PBX, CENTREX, and Single-line Telephones, Mar. 28, 1995) discloses call transfer operations in various telephone systems including a private branch exchange system (PBX).

Burd et al. (U.S. Pat. No. 5,432,845, Post Answer Telephone Call Redirection or Rerouting, Jul. 11, 1995) discloses a method of billing forwarded calls. A third party calls an 800 area code telephone subscriber phone. The original extension receiving the call then forwards the call to second extension. In Burd et al. '845, the original extension is charged only for the time used by that subscriber and the remainder of charges are placed on the second extension.

Greenspan (U.S. Pat. No. 5,517,560, Call Billing and Measurement Methods for Redirected Calls, May 14, 1996) discloses a method for generating two billing records for a redirected call. When a call is forwarded from one call network to another, two billing records are generated for time used on each telephone. The charge is then combined to form a single billing record which is sent to the billing center for processing. This method, however does not shift the charges. Greenspan '560 just generates one bill record for the entire call which leaves it up to the billing center to analyze.

Gupta (U.S. Pat. No. 4,788,719, Telephone Call Charge Allocation Arrangement, Nov. 29, 1988) discloses a method of charging forwarded telephone calls. Concerning a call forwarded from station one to station two, the Gupta '719 invention allocates charges between station one and station two according to the duration of the call.

None of the aforementioned patents shows a method of transferring all of the charges to the telephone receiving the forwarded call. A method of transferring all charges are necessary in situations such as a lodging house where an operator is used to connect to a call and then forward the call to a lodger. The lodger is the person using the telephone system and all the charges should go to the lodger. No separate calculation would be needed with a call charge transfer process. Also, such a method would be useful in an office environment where outside line access is limited. An office worker may have to ask the office operator to make a call to outside the office and forward the call. The office worker making the request should be charged for the entire duration of the call. Furthermore, such a method is useful in an environment where a customer calls a toll free 800 area code company information line. The user pays no cost, however the company must pay the fee. This becomes a problem when the customer has called the wrong department. Department A may have to transfer the call to department B which has its own toll free 800 billing. A charge transfer method would correct any improper billing of such charges. Another example concerns a client calling collect to a company. An operator will accept the call and then forward to the employee handling such client. The call charges should then be transferred to the employee. A call charge transfer process and apparatus is needed to properly bill the above circumstances. A call charge transfer method would also facilitate any further paper corrections of the charges. The unnecessary extra paper work and analysis will waste time and money.

SUMMARY OF THE INVENTION

It is therefore an object of the present invention to provide a method of transferring a call charge from an original subscriber to a call forwarded subscriber in a PBX system.

It is also an object to not have a separate calculation of call forwarded charges for each telephone extension.

It is another object to not have a user be charged for a call that was not intended for them.

It is also an object of the invention to have users have control of transferring the call charges when a call is forwarded.

To achieve the above objects, there is provided a call charge transferring method during call forwarding in a private branch exchange (PBX) system. A call connected to a first extension terminal is forwarded to a second extension terminal upon request for call forwarding from the first extension terminal. A determination is made whether the first extension terminal requests a call charge transfer. If a call charge transfer is made, then the information about the call charge of the first extension terminal for the call during the time period from a call set-up to the call forwarding is shifted to a call charge buffer of the second extension terminal. Then, it is determined whether the forwarded call is completed with the second extension terminal. When the call completes, the call charge of the second extension terminal is outputted.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 3 illustrates an example of call particulars.

DETAILED DESCRIPTION OF THE PREFERRED EMBODIMENT

Figure 1:
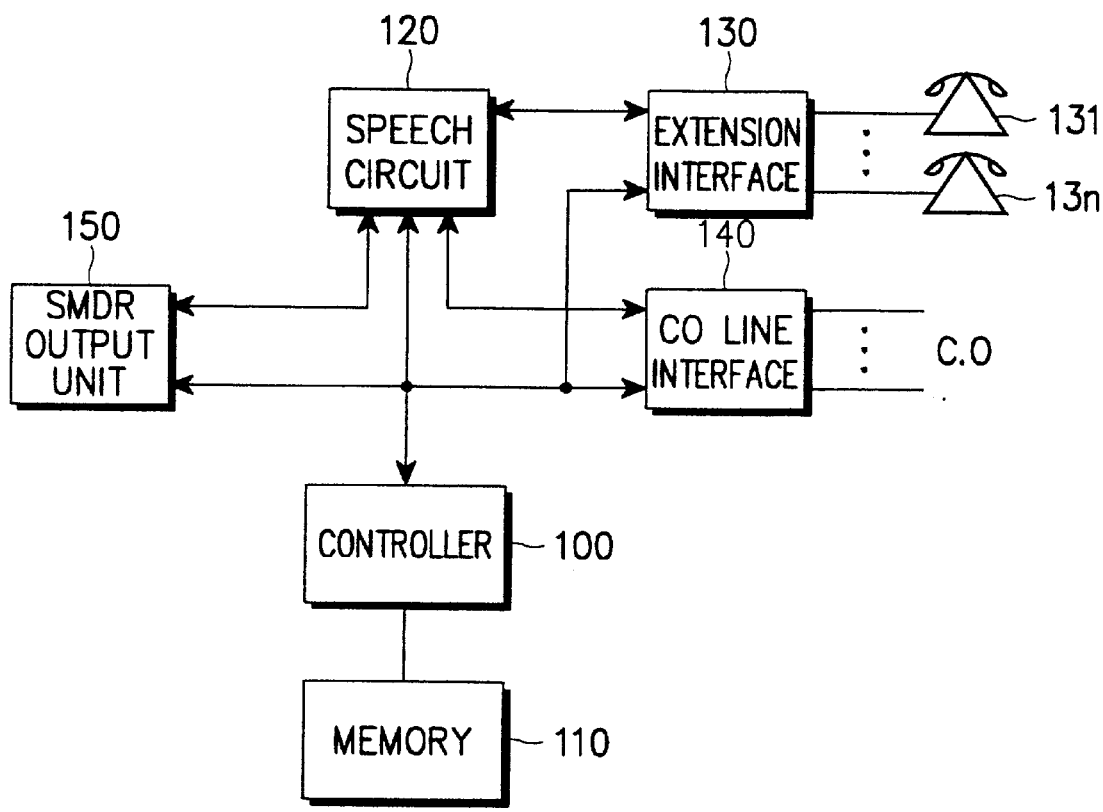
FIG. 1 is a block diagram of a PBX system to which the present invention is applied.

Referring to FIG. 1, the PBX system includes a controller 100. a memory 110, a speech circuit 120, an extension interface 130, extension terminals (or stations) 13 to 13n, a central office line interface (CO line interface) 140, and a station message detail recording (SMDR) output unit 150.

Figure 2:
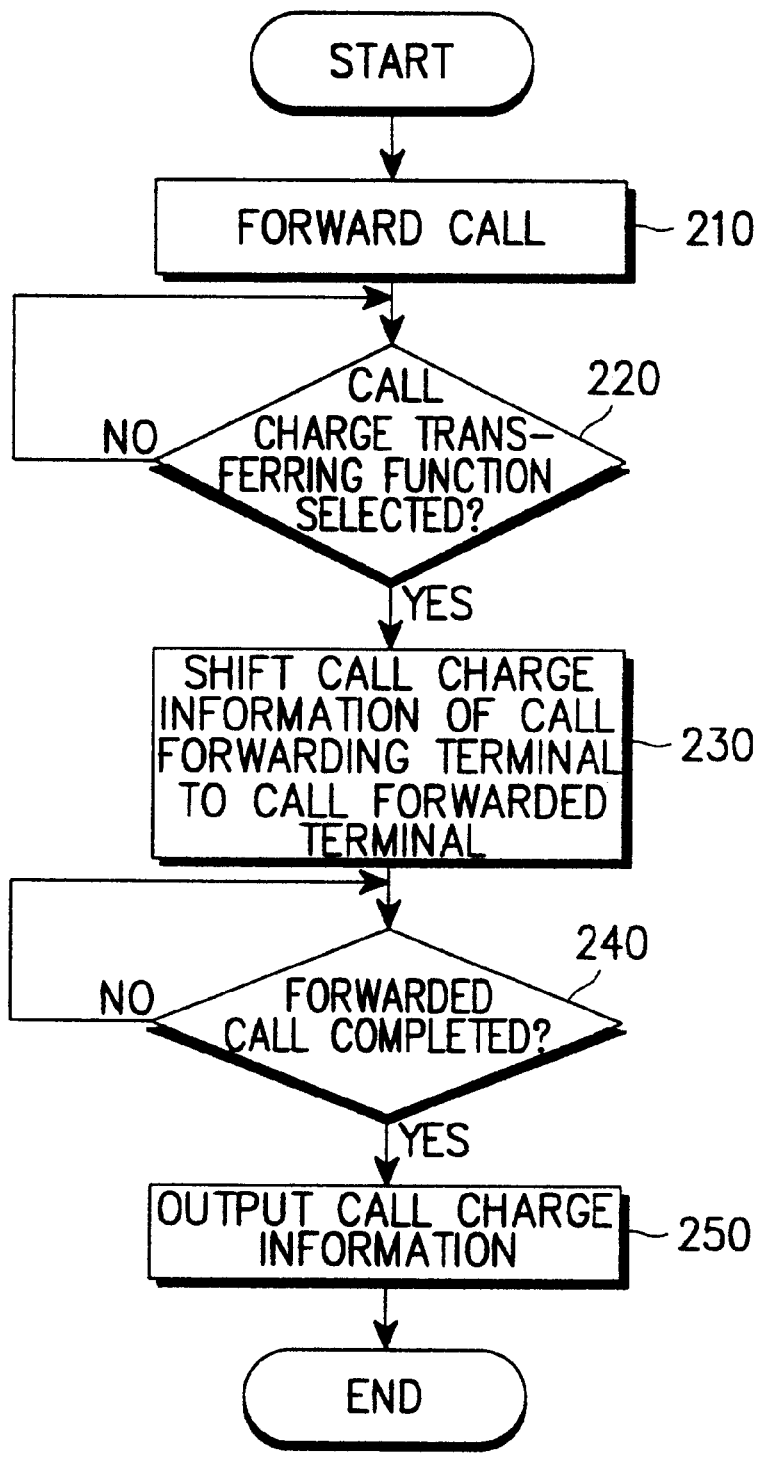
FIG. 2 is a flowchart of transferring call charge in call forwarding in the PBX system according to the present invention.

An operation of the PBX system is described by the following description. The controller 100 controls the speech circuit 120, the extension interface 130, the CO line interface 140, and the SMDR outputting unit 150 according to a control flow of the present invention. The memory 110 stores a control program for transferring call charge when a call is forwarded as shown in FIG. 2. The speech circuit 120 forms a speech path between the extension interface 130 and the CO line interface 140 under the control of the controller 100. The extension interface 130 interfaces data communication between the extension terminal 131 to 13n and the speech circuit 120. The extension terminals 131 to 13n have separately procured function keys for call charge transferring or selects a call charge transferring function by combining existing keys according to a program. The CO line interface140 is connected to a CO, and sends the speech circuit 120 a signal received though a CO line and a signal received from the speech circuit 120 to the CO under the control of the controller 100. The SMDR output unit 150 outputs call information between an extension subscriber and a CO line subscriber (e.g., call duration, calling and called telephone numbers, and call charge).

Referring to FIGS. 1 and 2, there will be given a description of the call charge transferring to a call forwarded extension subscriber during call forwarding. In step 210, upon a call forwarding request from a specific extension terminal through the extension interface 130, the controller 100 forwards a call to a destination extension terminal by controlling the extension interface 130. If the call forwarding extension subscriber intends to transfer his call charge to the call forwarded extension subscriber, he presses a call charge transferring function key of his terminal or enters a code for selecting a call charge transferring function. In step 220, the controller 100 determines whether the call charge transferring function is set for the call forwarding extension terminal through the extension interface 130. If it is, the controller 100 transfers the call charge of the call forwarding extension terminal to the call forwarded extension terminal through the extension interface 130, in step 230. That is, call charge information of the call forwarding extension terminal is shifted to a call charge buffer of the call forwarded extension terminal and then deleted. In step 240, the controller 100 determines whether the forwarded call is completed through the extension interface 130. Upon completion of the call, the controller 100 controls the SMDR output unit 150 to output the call charge of the call forwarded extension terminal. Here, the call charge of the call forwarded extension terminal includes the charge of the call forwarding extension terminal for a call before the call forwarding.

Referring to FIGS. 1 to 3, there will be given a description of an exemplary case where an extension terminal 131 forwards a call to another extension terminal 132 transferring its call charge. The extension terminal 131 first dials a telephone number 123-4567. Then, the controller 100 controls the speech circuit 120 to form a speech path between the extension terminal 131 and a called CO line subscriber. Then, the extension terminal 131 forwards a call in progress to the extension terminal 132, selecting a call charge transferring function if he wants to. When the controller 100 senses the selection of the call charge transferring function by the extension terminal 131 through the extension interface 130, it shifts the call charge incurred to the extension terminal 131 for the call with the called CO line subscriber to the call charge buffer of the extension terminal 132. If the forwarded call is completed, the controller 100 controls the SMDR output unit 150 to output call particulars as shown in FIG. 3.

In accordance with the present invention, a call charge transfer occurs simultaneously with a call forwarding from an extension subscriber to another extension subscriber in a PBX system. In the case of a PBX system of a lodging house, call charge can also be transferred when an operator dials an intended telephone number upon a call request from a lodger and forwards a call to the lodger. Hence, there is no need for separately calculating the call charge for the lodger.

While the present invention has been described in detail with reference to the specific embodiment, it is a mere exemplary application. Thus, it is to be clearly understood that many variations can be made by anyone skilled in the art within the scope and spirit of the present invention.

What is claimed is:

1. A method, comprising the steps of:

connecting a call to a first extension;

requesting said call being forwarded from said first extension to a second extension;

forwarding said call from said first extension to said second extension;

determining whether said first extension requests a transfer of a charge for said call of said first extension, said charge dependent on a resultant time duration of said call;

contemporaneously upon determining said first extension requesting said transfer of said charge, shifting said charge of said first extension to a buffer of said second extension, said charge of said first extension being from a duration between connecting said call to said first extension until forwarding said call;

determining whether said call is completed; and outputting said charge of said second extension upon completion of said call, said charge of said second extension call being from a duration between connecting said call to said first extension until completion of said call by said second extension.

2. The method of claim 1, further comprising of outputting said charge of said first extension upon completion of said call forwarded to said second extension, said charge of said first extension being zero.

3. The method of claim 1, wherein connecting said call to said first extension includes said call by said first extension to a central office line subscriber.

4. The method of claim 1, wherein connecting said call to said first extension includes said first extension calling a third extension.

5. The method of claim 1, wherein connecting said call to said first extension includes said first extension accepting a collect call from an external subscriber, said call being initially charged to said first extension.

6. The method of claim 1, wherein connecting said call to said first extension includes a call from a central office line subscriber to said first extension, said first extension being a part of a toll free area code extension service, said call being initially charged to said first extension.

7. The method of claim 1, wherein initiating said transfer of said charge of said first extension by manually pressing a button on said first extension.

8. The method of claim 1, wherein initiating said transfer of said charge of said first extension by entering a pre-programmed code, said pre-programmed code manually entered using a plurality of buttons on said extension, said buttons also used for dialing a telephone number.

9. The method of claim 1, wherein said first extension and said second extension are a part of a private branch exchange system.

10. A method, comprising the steps of:

connecting a first station of a private branch exchange system with a central office line subscriber;

having said first unit of said private branch exchange system control a second unit to form a speech path between said first station and said central office line subscriber, said second unit having a speech circuit;

forwarding, by said first station, said call to a second station of said private branch exchange system;

selecting, by said first station, to transfer a charge of said call of said first station, said charge dependent on a resultant time duration of said call, said charge of said first station being from a time period between connecting with said central office line subscriber until forwarding said call to said second station;

contemporaneously with said selecting, said first unit shifting said charge of said first station to a buffer of said second station;

determining with said first unit whether said call is completed; and contemporaneously with said call completion, said first unit controlling a third unit to output said charge of said second station, said third unit recording and outputting call details, said call charge of said second station being from a second time period between connecting said call to said first station to said completion of said call by said second station.

11. The method of claim 10, further comprised of outputting said charge of said first station upon completion of said call forwarded to said second station, said charge of said first station being zero.

12. The method of claim 10, wherein said connecting is made by dialing a telephone number by a first station of a private branch exchange system to a central office line subscriber.

13. The method of claim 10, wherein said connecting is made by said office line subscriber calling collect to said first station of said private branch exchange system, said first station being initially charged.

14. The method of claim 10, wherein said selecting to transfer said first station call charge is made by manually pressing a key on said first station.

15. The method of claim 10, wherein said selecting to transfer said charge of said first station by entering a pre-programmed code, said pre-programmed code manually entered using a plurality of keys on said station.

16. The method of claim 10, wherein transferring of said charges is controlled by a program stored in a memory of said private branch exchange system.

17. An apparatus, comprising:

a first unit controlling said apparatus;

a memory used by said first unit, said memory storing a control program for transferring call charges when a call is forwarded from a first station to a second station;

a second unit having a speech circuit forming a speech path between a first interface and a second interface under the control of said first unit;

said first interface interfacing data communication between a plurality of stations and said second unit;

said stations attaching to said first interface;

a key on said stations allowing transfer of said call;

said second interface connecting said first interface to a third station; and a third unit recording call details and outputting call information between said stations connected to said first interface and said third station connected to said second interface.

18. The apparatus of claim 17, wherein said stations include a plurality of keys manipulated manually in a set sequence, according to said program stored in said memory, for transferring said charges.

19. An apparatus, comprising:

a controller;

a memory connecting to said controller, said memory storing a control program for transferring call charges when a call is forwarded;

a speech circuit, under the control of said controller, forming a speech path between an extension interface and a central office line interface;

said extension interface, under the control of said controller, connecting with a plurality of stations;

said stations connecting a call with a central office, said station transferring said call charges when said call is forwarded from one station to another;

said central office line interface connecting with said central office; and a station message detail recording unit, under the control of said controller, connecting with said central office line interface, said speech circuit, and said extension interface, said station message detail recording output unit outputting call information between said station and said central office.

* * * * *